Aug. 28, 1923.
F. D. LEA
TRUCK FOR TALKING MACHINES
Filed Sept. 9, 1921
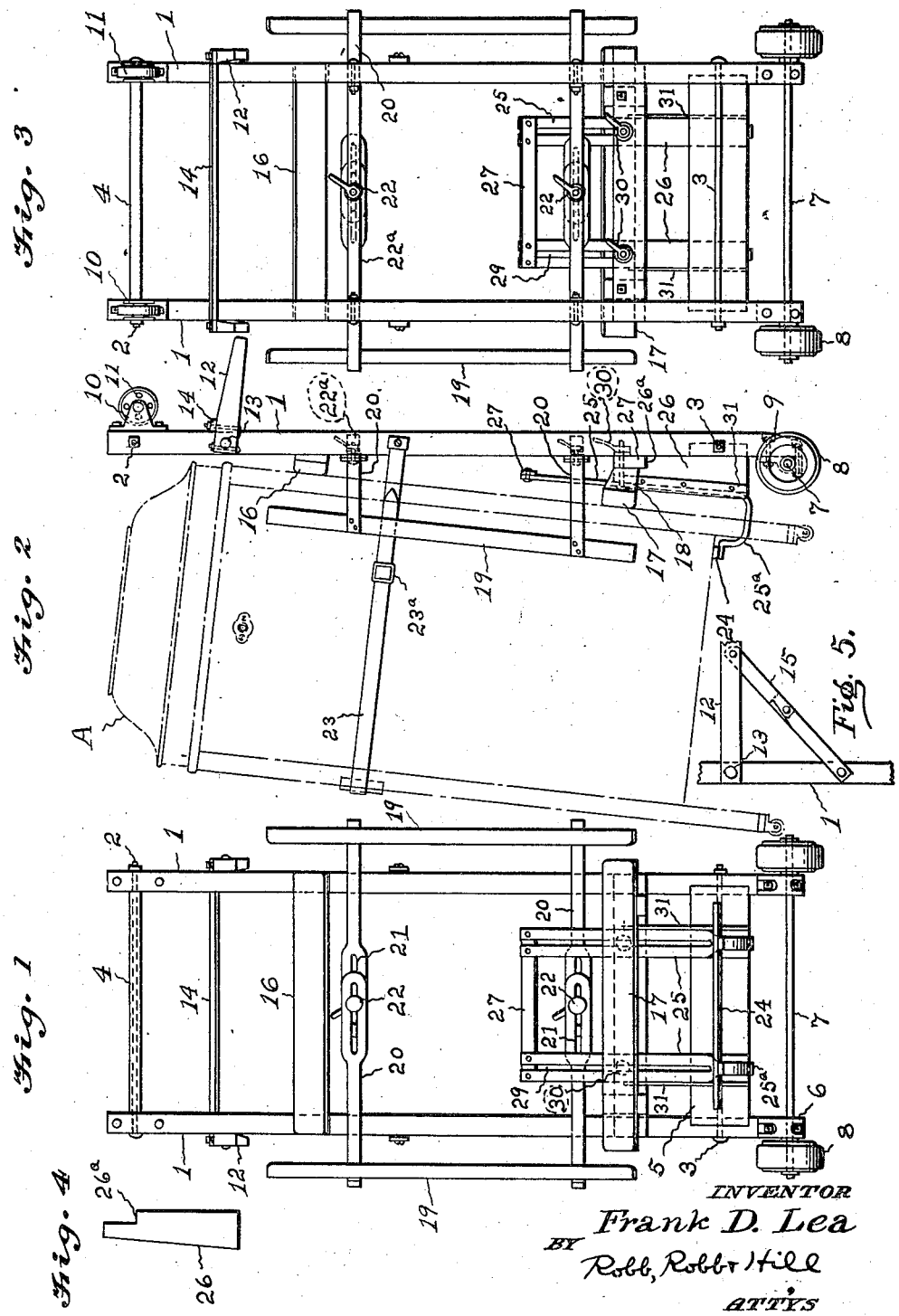
INVENTOR
Frank D. Lea
BY Robb, Robb & Hill
ATTYS Patented Aug. 28, 1923.

1,465,945

UNITED STATES PATENT OFFICE.

FRANK D. LEA, OF FINDLAY, OHIO.

TRUCK FOR TALKING MACHINES.

Application filed September 9, 1921. Serial No. 499,509.

*To all whom it may concern:*

Be it known that I, FRANK D. LEA, citizen of the United States, residing at Findlay, in the county of Hancock and State of Ohio, have invented certain new and useful Improvements in Trucks for Talking Machines, of which the following is a specification.

The present invention relates to a truck which has been especially designed for handling talking machines and like articles, and embodies novel features of construction whereby a talking machine or the like can be readily loaded into a vehicle for transportation or carried up a flight of steps.

Further objects of the invention are to provide a device of this character which can be easily and quickly adjusted for proper engagement with different sizes and makes of talking machines, which will enable the talking machines to be moved without injuring the same or marring the finish thereof, and which has a strong and sturdy construction, well adapted to withstand the hard usage to which such devices are subjected without danger of being broken or getting out of repair.

With these and other objects in view the invention consists in certain combinations and arrangements of the parts as will more fully appear as the description proceeds, the novel features thereof being pointed out in the appended claims.

For a full understanding of the invention, reference is to be had to the following description and accompanying drawings in which:

Figure 1 is a front elevation of a talking machine truck constructed in accordance with the invention.

Figure 2 is a side elevation of the same, the position assumed by a talking machine when mounted thereon being indicated by dot and dash lines.

Figure 3 is a rear elevation of the talking machine truck.

Figure 4 is a detail view of one of the longitudinally extending blocks upon which the slides which adjustably carry the supporting bar are mounted.

Figure 5 is a detail view showing a hinged brace member which may be utilized in connection with the handles, if desired.

Corresponding and like parts are referred to in the following description and indicated on all of the views of the drawings by like reference characters.

Referring to the drawings which illustrate one of many possible embodiments, and that embodiment of the invention which I now consider to be the best, of the invention, the numerals 1 designate the side bars of the truck which have a substantially spaced and parallel relation and are connected at points toward the opposite ends thereof by the tie bars or bolts 2 and 3. A piece of pipe 4 surrounds the upper tie bolt 2 and is interposed between the side bars 1 to hold the latter in a properly spaced relation. At the lower end of the truck a cross piece 5 is interposed between the side bars 1 at a point adjacent to the tie bolt 3 and performs a function similar to that of the pipe 4.

At the lower end of the truck the side bars 1 are provided with bearings 6 which project laterally from the front of the truck. A shaft 7 extends through the bearings and carries the rollers 8, said rollers being of such a size and being disposed in such a manner that the rear edges of the side bars 1 are substantially tangential to the peripheries thereof. It will also be noted that the lower ends of the side bars 1 are bevelled toward the rollers, as indicated at 9. This construction facilitates the sliding of the truck over the edge of a stair until the rollers 8 are drawn over the edge of the stair and can roll upon the tread of the stair.

At the uper or opposite end of the truck the side bars 1 are provided with bearing brackets 10 which project rearwardly from the truck and have the caster wheels 11 journalled thereon. These latter caster wheels are intended to be used when loading the truck upon a vehicle for transportation purposes. The upper end of the truck is also provided with handles 12 which are pivotally connected at 13 to the side bars 1 so that they can either be swung downwardly into an inoperative position against the sides of the side bars, or swung outwardly into an operative position, as indicated very clearly by Figure 2. The two handles 12 are connected by a cross piece 14 which causes them to move in unison and also provides a stop which engages the side bars when the handles have been swung outwardly into operative position. If desired, as indicated by Figure 5, a hinged brace 15 may be applied to each of the handles 12. These hinged braces limit the outward swinging movement of the handles and also lock them in operative position so that they cannot be collapsed until after the hinge joint has been broken. The handles are thus held firmly in operative position so that they will not have a tendency to fold down when the wheels strike an obstruction.

When the talking machine is in position upon the truck it rests against an upper padded cross bar 16 and a lower padded cross bar 17, the latter being off-set forwardly from the truck by suitable means such as the blocks 18 so that the talking machine assumes an inclined position with respect to the truck. This will be clear from reference to Figure 2, in which the position of the talking machine A is indicated by dot and dash lines.

The sides of the talking machine are engaged by clamping bars 19 which are suitably padded or cushioned so that they will not mar the finish of the talking machine. These clamping bars are carried by the outwardly curved ends of bars 20 which slidably engage the truck and are adjustably connected so that the clamping bars can be moved toward and away from each other and properly positioned for engagement with different sizes and makes of talking machines. The inner ends of the two sets of bars 20 are shown as enlarged and slotted at 21 to receive a clamping bolt 22, the latter being adapted to be tightened to hold the clamping bars in an adjusted position and passing through an opening in a cross bar 22ª connecting the side bars 1. In addition to the clamping bars, a suitable strap 23 may be utilized to secure the talking machine A to the truck. The strap extends around the talking machine and is secured to the sides of the truck, being provided with a suitable buckle 23ª so that it can be readily tightened in the usual manner to hold the talking machine securely in position.

The bottom of the talking machine is engaged by a transverse supporting bar 24 which is carried by the outwardly deflected lower ends 25ª of longitudinally extending slides 25, the latter being adjustably mounted so that they can be moved up and down to properly position the supporting bar 24 according to the size and make of the talking machine to be handled. These slides 25 engage the outer faces of substantially wedge-shaped blocks 26 which are applied to the truck, the lower ends of the blocks being secured to the before mentioned cross piece 5, while the upper ends of the blocks are notched at 26ª for engagement with a cross bar 27. Strips 31 are applied to the outer sides of the blocks 26 and project forwardly beyond the blocks to provide guide flanges which engage the slides 25 to direct the latter in their up and down movements. These slides 25 are longitudinally slotted at 29 to receive clamping bolts 30 which extend through the cross bar 27 and are provided at their lower ends with wing nuts, so that they can be readily tightened to hold the parts in an adjusted position. The upper ends of the slides 25 are connected by a strip 27 which can be conveniently grasped by the operator when moving the slides up and down to bring the supporting bar 24 into proper engagement with the bottom of the talking machine.

In the operation of the device the truck is wheeled against the back of the talking machine and the latter securely fastened to the truck while standing in a normal position upon the floor. The adjustments for securing the talking machine to the truck have been fully described and need not be repeated here. The lower wheels 8 then form a fulcrum about which the truck can be swung to lift the talking machine from the floor preparatory to moving the same. When rolling the truck over the floor the lower wheels 8 are used and the operator grasps the handles 12. The same wheels are also used to carry the talking machine up a flight of stairs, the disposition of the rollers being such that the side bars of the truck can slide readily over the edge of each stair until the rollers 8 ride over the edge of the stair and travel upon the tread of the stair. In this connection it will be noted that all of the cross pieces and clamping bolts are arranged in such a manner that there are no members projecting rearwardly from the side bars to interfere with this movement of the truck up a flight of steps. When it is desired to load the truck into a vehicle, the upper caster wheels 11 are utilized in a manner which it is thought will be quite obvious, the handles 12 being collapsed and the truck handled from the other end.

While I have described one particular embodiment of the invention in detail, it will be obvious that many modifications and changes can be made in the details of construction without departing from the spirit of the invention and all within the scope of the appended claims.

Having thus described my invention what I claim as new and desire to secure by Letters Patent is:

1. A truck of the character described, including a frame, rollers for the frame, a rest upon the frame for engaging the article to be transported, side clamping bars extending longitudinally of the frame and movable laterally thereof toward and away from each other so that they can be moved into engagement with opposite sides of the article being transported, and means for locking the side clamping bars in an adjusted position.

2. A truck of the character described, including a frame, rollers for the frame, a rest upon the frame for engaging the article to be transported, side clamping bars extending longitudinally of the frame and movably mounted thereon for lateral movement toward and away from each other, so that they can be brought into engagement with opposite sides of an article to be transported, means for locking the side clamping bars in an adjusted position, an outstanding bottom supporting element slidably mounted upon the frame and adapted to be brought into engagement with an end of the article being transported, and means for locking the bottom supporting element in an adjusted position.

3. A truck of the character described, including a frame, rollers for the frame, a rest upon the frame for engaging the articles to be transported, side clamping bars, transversely-extending slides carrying the respective side clamping bars and having overlapping end portions, and clamping means engaging the overlapping portions of the slides to lock the slides and side clamping bars in an adjusted position, said side clamping bars being movable toward and away from each other and being adapted to be brought into engagement with opposite sides of the article to be transported.

4. A truck of the character described, including a frame, supporting rollers for the frame, a rest at the front of the frame, side clamps adjustable upon the frame and movable into engagement with the sides of an article supported by the before mentioned rest, longitudinally extending slides adjustable upon the frame, and a forwardly off-set supporting bar carried by the slides and adjustable for engagement with the bottom of the member being carried.

5. A truck of the character described, including a frame, supporting rollers for the frame, a rest upon the frame for engaging the article being carried, longitudinally extending guide blocks upon the frame, slides mounted upon the guide blocks, a forwardly off-set supporting bar carried by the slides and adapted to engage the bottom of the member being carried, and means for locking the slides in an adjusted position.

6. A truck of the character described, including a frame, rollers at one end of the frame arranged with the peripheries thereof projecting beyond the end of the frame and with the rear face of the frame substantially tangential thereto so that the frame can be drawn upwardly over stairs and the rollers caused to roll over the stair edges and upon the stair treads, and means for securing the article to be carried to the front of the frame and at an inclination with respect thereto whereby the rollers are off-set from the member and can be used as a fulcrum when tilting the truck to lift the member from the floor.

In testimony whereof I affix my signature.

FRANK D. LEA.